US007441662B2

(12) United States Patent
Ronkainen

(10) Patent No.: US 7,441,662 B2
(45) Date of Patent: Oct. 28, 2008

(54) STATOR FOR A FLOTATION CELL

(75) Inventor: Seppo Ronkainen, Kauniainen (FI)

(73) Assignee: Outotec Oyj, Espoo (FI)

(*) Notice: Subject to any disclaimer, the term of this patent is extended or adjusted under 35 U.S.C. 154(b) by 57 days.

(21) Appl. No.: 10/598,753

(22) PCT Filed: Mar. 31, 2005

(86) PCT No.: PCT/FI2005/000169

§ 371 (c)(1),
(2), (4) Date: Sep. 11, 2006

(87) PCT Pub. No.: WO2005/097335

PCT Pub. Date: Oct. 20, 2005

(65) Prior Publication Data

US 2007/0193927 A1 Aug. 23, 2007

(30) Foreign Application Priority Data

Apr. 6, 2004 (FI) .................................. 20040499

(51) Int. Cl.
*B03D 1/16* (2006.01)
*B01D 1/14* (2006.01)

(52) U.S. Cl. ...................................... 209/169; 209/168

(58) Field of Classification Search ................. 209/169, 209/168

See application file for complete search history.

(56) References Cited

U.S. PATENT DOCUMENTS 2,190,852 A * 2/1940 Tucker ......................... 261/93
2,626,052 A * 1/1953 Carbonnier ................. 209/169
2,696,913 A 12/1954 Anderson

FOREIGN PATENT DOCUMENTS

| | | | |
|---|---|---|---|
| RU | 2187380 | | 8/2002 |
| SU | 9390094 | * | 6/1982 |
| SU | 1273174 | * | 11/1986 |

* cited by examiner

*Primary Examiner*—Thomas M Lithgow
(74) *Attorney, Agent, or Firm*—Smith-Hill and Bedell

(57) ABSTRACT

The invention relates to a stator for a flotation cell to be used in the flotation of slurry-like material, such as ore and concentrate containing valuable minerals, said stator including flow regulators installed at regular distances from each other. The stator flow regulators are installed to be movable, so that the flow regulators can be adjusted at a desired distance from the rotor rotation axis.

6 Claims, 1 Drawing Sheet

STATOR FOR A FLOTATION CELL

Figure 1:
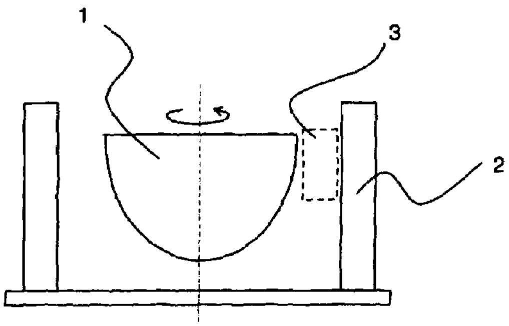

This is a national stage application filed under 35 USC 371 based on International Application No. PCT/FI2005/000169 filed Mar. 31, 2005, and claims priority under 35 USC 119 of Finnish Patent Application No. 20040499 filed Apr. 6, 2004.

The present invention relates to a stator for a flotation cell to be used in the flotation of slurry-like material, such as ore and concentrate containing valuable minerals, by which stator the orientation of the slurry flow created by the rotor of the flotation cell can advantageously be controlled.

A flotation machine used in the recovery of valuable ingredients usually includes a flotation cell provided with an inlet aperture for feeding slurry into the cell, and an outlet aperture for the non-floatable material to be discharged from the flotation cell. The air needed for creating froth is fed through a hollow, rotatable shaft, which shaft is connected to an agitator element that agitates the slurry in order to keep it in suspension. When the rotor serving as the agitator rotates, air is fed in the slurry, and air bubbles are dispersed in the slurry. The stator installed around the rotor guides the circulations of the suspension formed by slurry and air. The stator causes shear forces in the flows emitted from the rotor, which further affect the size of the air bubbles to be created. It can be generally maintained that the stronger the shear forces are, the smaller particles they affect. In addition, into the flotation cell there are fed reagents that are attached onto the surface of the valuable particles that are contained in the slurry and should be recovered. The reagents make the valuable particles hydrophobic and thus enhance their attachment to the air bubbles. As the valuable particles are attached to the air bubbles, the valuable particles start rising upwards, towards the free top surface of the flotation cell, where they form a stable foam bed.

For example the U.S. Pat. No. 5,039,400 and the PCT patent application Ser. Nos. 01/43881 and 01/49388 describe a flotation cell used for floating ore and concentrate containing valuable minerals, wherein a stator is installed around the rotor. The stator includes spaced-apart flow regulating members that are interconnected at least by a frame structure provided at the bottom part of the regulating members. This kind of a stator formed of flow regulating members and a frame is manufactured of one piece, and consequently, as the flotation cell sizes have grown, also the stator has become an essentially large object that is heavy and troublesome to handle, which as such increases expenses. In addition, the flow regulators do not have any influence in the shear forces that affect the size of the air bubbles, because the flow regulators are essentially in a similar position on every side of the rotor.

The object of the present invention is to eliminate drawbacks of the prior art and to achieve an improved stator for a flotation cell to be used in the flotation of slurry-like material, such as ore and concentrate containing valuable minerals, said stator including flow regulators and positioned round a rotor, by means of which stator the slurry flow emitted from the rotor can be adjusted, and different shear forces can be created in the slurry flow. The essential novel features of the invention are apparent from the appended claims.

According to the invention, in a stator for a flotation cell to be used in the flotation of slurry-like material, such as ore and concentrate containing valuable minerals, said stator including flow regulators and being installed around the rotor, a structural element including at least one flow regulator is installed movably, in which case the position of the flow regulator with respect to the rotor rotation axis is adjustable, so that those sides of the flow regulators of the stator that are placed nearest to the rotor rotation axis are preferably located at essentially equal distance from the rotor rotation axis. According to the invention, the equal distance means that the position of the flow regulators with respect to the rotor rotation axis can be adjusted, so that the flotation cell can be used for floating particles of different sizes. When the essentially equal distance is reduced, the size of the particles to be floated can also be reduced.

According to the invention, the adjusting of the position of the flow regulators provided in the stator with respect to the rotor rotation axis by moving the flow regulator can also be applied so that those sides of the flow regulators that are placed nearest to the rotor rotation axis are at least partly located at an essentially unequal distance from the rotor rotation axis. Thus for example at least two adjacent flow regulators create an unequal distance between the rotor and the stator. In at least two adjacent structural elements including at least one flow regulator, the unequal distance between the rotor and the stator is advantageously achieved by aligning those sides that are nearest to the rotor at an unequal distance from the rotor rotation axis. In at least two adjacent structural elements including at least one flow regulator, the unequal distance between the rotor and the stator can also be advantageously achieved so that those sides of at least two structural elements including at least one flow regulator that are located nearest to the rotor are designed to be at least partly different. By using flow regulators that are located at an essentially unequal distance from the rotor rotation axis, advantageous conditions can be created for the wearing of the different sides of the flow regulators.

The stator of a flotation cell according to the invention advantageously comprises a structural element including one flow regulator, but the stator structural element can also comprise two or several structural elements including a flow regulator. According to the invention, the distance between the rotor and the stator is in an embodiment of the invention made different in two adjacent flow regulators. Even in this case, when the stator structural element includes two or more flow regulators, the distance between the rotor and the stator can at two adjacent flow regulators be essentially equal, but the distance between the rotor and the stator is, however, essentially unequal at two adjacent structural elements.

According to an embodiment of the invention, the structural elements of the stator of the flotation cell can be aligned, so that preferably for example that side of every second structural element that is placed nearest to the rotor is located further from the rotor rotation axis than that side of the structural element located between said two structural elements that is nearest to the rotor. The structural elements can also be aligned so that the side nearest to the rotor of every third or even every fourth structural element is located further than the structural elements placed between said structural elements.

When different distances should be used between the rotor rotation axis and the stator structural element, the structural element can be designed so that those sides of adjacent structural elements that are placed nearest to the rotor are at least partly different in shape. In that case adjacent structural elements can be attached at an essentially equal distance from the rotor rotation axis, but adjacent structural elements are different in shape either in their middle section or their top section, in which case the different parts of that side that is nearest to the rotor are located at an unequal distance from the rotor rotation axis.

According to the invention, the distance of the stator and the rotor can also be made unequal between two adjacent structural elements so that the adjacent structural elements are different both in their position with respect to the rotor rotation axis and to the shape of the side that is nearest to the rotor.

Figure 2:
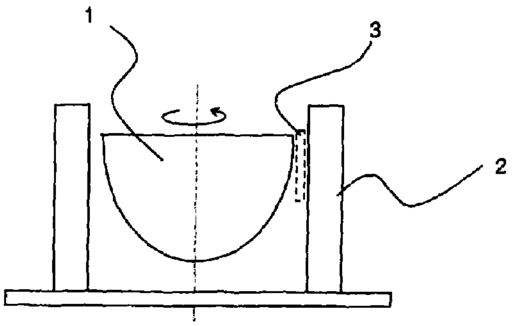
Figure 3:
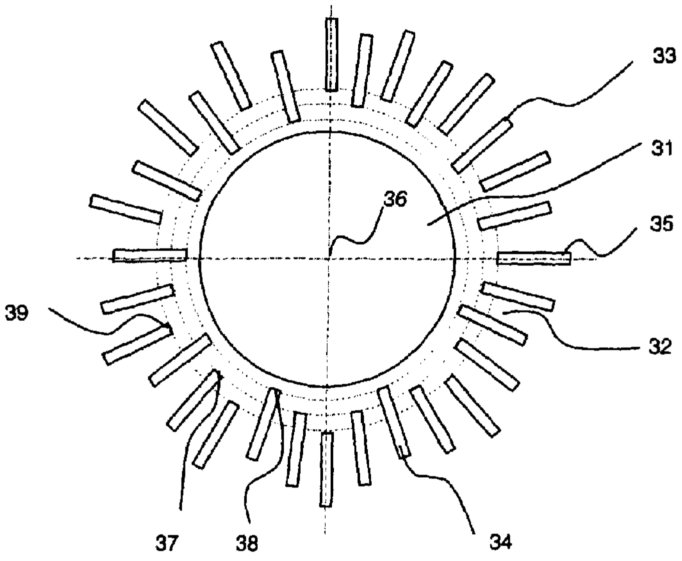

The invention is described in more detail with reference to the appended drawings, where FIG. 1 is a schematical side-view illustration of a preferred embodiment of the invention, FIG. 2 is a schematical side-view illustration of a preferred embodiment of the invention illustrated in FIG. 1, in a situation where the flow regulators are located at unequal distances from the rotation axis, and FIG. 3 is a schematical top-view illustration of a preferred embodiment of the invention.

According to FIGS. 1 and 2, around the flotation cell rotor 1, there is installed a stator 4 composed of structural elements 2, each including one flow regulator, said structural elements being arranged movably around the rotor 1, so that the distance of the structural elements 2 from the rotor rotation axis 5 can be adjusted. In FIGS. 1 and 2, dotted lines 3 describe the area that is located between the rotor 1 and the flow regulator 2 of the stator 4. The area described by dotted lines 3 in FIG. 1 is larger than the corresponding area in FIG. 2, because the distance of the flow regulators 2 from the rotor rotation axis 5 is longer. In FIG. 1, the flow regulators 2 arranged on different sides of the rotor rotation axis 5 are located at an essentially equal distance from the rotation axis 5.

In an embodiment according FIG. 3, around the flotation cell rotor 31 there is installed a stator 32 composed of structural elements 33, 34 and 35, each including one flow regulator. Those sides 37 of the structural elements 33 that are nearest to the rotor rotation axis 36 are installed so that the sides 37 are located further away from the rotation axis 36 than those sides 38 of the structural elements 34 that are located nearest to the rotation axis, but yet nearer to the rotor rotation axis 36 than the sides 39 of the structural elements 35 that are located farthest from the rotation axis.

The invention claimed is:

1. A flotation cell for use in the flotation of slurry-like material, such as ore and concentrate containing valuable minerals, the flotation cell comprising:

a rotor mounted to rotate about an axis, and a stator including a plurality of flow regulators that are angularly spaced apart about the rotor, and wherein each flow regulator has an inner side that is nearest to the rotor and extends substantially parallel to the axis of rotation of the rotor over substantially the entire height of the rotor at a substantially uniform distance from said axis of rotation; the flow regulators are movable radially relative to the axis of rotation of the rotor, whereby different flow regulators may be located at selected respective distances from said axis of rotation; the flow regulators include first, second and third angularly adjacent flow regulators, with the second flow regulator angularly between the first and third flow regulators; and the inner side of the second flow regulator is farther from said axis of rotation than is the inner side of the first flow regulator and is closer to said axis of rotation than is the inner side of the third flow regulator.

2. A flotation cell according to claim 1, wherein the flow regulators are disposed substantially radially relative to the axis of rotation of the rotor.

3. A flotation cell according to claim 1, wherein the flow regulators comprise multiple groups of first, second and third angularly adjacent flow regulators and within each group the second flow regulator is angularly between the first and third flow regulators and the inner side of the second flow regulator is farther from said axis of rotation than is the inner side of the first flow regulator and is closer to said axis of rotation than is the inner side of the third flow regulator.

4. A flotation cell for use in the flotation of slurry-like material, such as ore and concentrate containing valuable minerals, the flotation cell comprising:

a rotor mounted to rotate about an axis, and a stator including a plurality of flow regulators that are angularly spaced apart about the rotor, and wherein each flow regulator has an inner side that is nearest to the rotor and extends substantially parallel to the axis of rotation of the rotor over substantially the entire height of the rotor at a substantially uniform distance from said axis of rotation; the flow regulators are movable radially relative to the axis of rotation of the rotor, whereby different flow regulators may be located at selected respective distances from said axis of rotation; the flow regulators include first, second and third angularly adjacent flow regulators, with the second flow regulator angularly between the first and third flow regulators; and the inner side of the second flow regulator is farther from said axis of rotation than is the inner side of the first flow regulator and the inner side of the third flow regulator.

5. A flotation cell according to claim 1, wherein the flow regulators are disposed substantially radially relative to the axis of rotation of the rotor.

6. A flotation cell according to claim 4, wherein the flow regulators comprise multiple groups of first, second and third angularly adjacent flow regulators and within each group the inner side of the second flow regulator is farther from said axis of rotation than is the inner side of the first flow regulator and the inner side of the third flow regulator.

* * * * *